US012748459B2

(12) United States Patent
Foote et al.

(10) Patent No.: US 12,748,459 B2
(45) Date of Patent: Sep. 29, 2026

(54) WRISTBAND DEVICE FOR ENHANCED AUDIENCE ENGAGEMENT AT LIVE EVENTS

(71) Applicant: CrowdSync Technology LLC, New York, NY (US)

(72) Inventors: Christopher Foote, New York, NY (US); Duncan Abdelnour, New York, NY (US); Lawrence Helfant, New York, NY (US); Brian Pelan, New York, NY (US)

( * ) Notice: Subject to any disclaimer, the term of this patent is extended or adjusted under 35 U.S.C. 154(b) by 116 days.

(21) Appl. No.: 18/772,042

(22) Filed: Jul. 12, 2024

(65) Prior Publication Data

US 2025/0028356 A1 Jan. 23, 2025

Related U.S. Application Data

(60) Provisional application No. 63/514,424, filed on Jul. 19, 2023.

(51) Int. Cl.

| | |
|---|---|
| ***G06F 1/16*** | (2006.01) |
| ***B06B 1/04*** | (2006.01) |
| ***G06K 19/077*** | (2006.01) |
| ***H04W 4/80*** | (2018.01) |
| ***H05B 45/20*** | (2020.01) |
| ***H05B 47/155*** | (2020.01) |
| ***H05B 47/19*** | (2020.01) |

(52) U.S. Cl.

CPC ................ *G06F 1/163* (2013.01); *B06B 1/04* (2013.01); *G06K 19/07705* (2013.01); *H04W 4/80* (2018.02); *H05B 45/20* (2020.01); *H05B 47/155* (2020.01); *H05B 47/19* (2020.01); *G06F 2213/0042* (2013.01)

(58) Field of Classification Search

CPC ... G06F 1/163; G06F 2213/0042; B06B 1/04; G06K 19/07705; H04W 4/80; H05B 45/20; H05B 47/155; H05B 47/19

USPC ........................................................ 340/7.61

See application file for complete search history.

(56) References Cited

U.S. PATENT DOCUMENTS

| | | | | |
|---|---|---|---|---|
| D978,006 S * | 2/2023 | Hu | D11/3 | |
| 2016/0203685 A1* | 7/2016 | Schwartz | H04R 1/028 | 340/407.1 |
| 2018/0295682 A1* | 10/2018 | Machida | H05B 45/20 | |
| 2019/0045296 A1* | 2/2019 | Ralph | H04R 1/2807 | |
| 2019/0147711 A1* | 5/2019 | Grom | G08B 5/38 | 340/539.13 |

* cited by examiner

*Primary Examiner* — Omar Casillashernandez

(74) *Attorney, Agent, or Firm* — Kaustubh Nadkarni; Nadkami Law PLLC

(57) ABSTRACT

The present invention relates to a wristband device for enhanced audience engagement at live events such as concerts, stage shows, conference and operas. The wristband device includes wrap-around LEDs, a haptic motor, an RFID-based chip and a control unit providing a customizable macro function. The plurality of LEDs are distributed around a band to provide 360-degree light emission for a dynamic and bright light experience. The haptic motor is used to generate a vibration sensation to either signal an alert or highlight an important aspect of the live event. The customized lighting and vibration effects are provided to the audience which are controlled by a Digital multiplex via radio frequency (RF-DMX) to enable dynamic participation of the audience to the live event.

19 Claims, 8 Drawing Sheets

WRISTBAND DEVICE FOR ENHANCED AUDIENCE ENGAGEMENT AT LIVE EVENTS

CROSS-REFERENCE TO RELATED APPLICATIONS

This application claims priority from prior utility provisional application with the application No. 63/514,424 filed on Jul. 19, 2023. The entire collective teachings thereof being herein incorporated by reference.

STATEMENT REGARDING FEDERALLY SPONSORED RESEARCH OR DEVELOPMENT

Not Applicable.

REFERENCE TO A SEQUENCE LISTING, A LARGE TABLE, OR A COMPUTER PROGRAM LISTING APPENDIX ON READ-ONLY OPTICAL DISC (IF APPLICABLE)

Not Applicable.

FIELD OF THE INVENTION

This invention generally relates to a wristband device for enhanced audience engagement at live events and more specifically, a wristband device to function as an attendee immersion/inclusion tool with a customizable macro function that enables the connection of the audience to a live event through predefined light and vibration modes.

BACKGROUND OF THE INVENTION

In recent times, the live event industry has embraced advanced technologies such as wearable devices, virtual reality, and live streaming to enhance audience engagement and boost business. Many devices and setups are designed to integrate with the audience and the venue (e.g., auditorium) to make live events more captivating. Among these advanced technologies, wearable devices play a crucial role in engaging the audience at live events.

The wearable devices currently available in the market for engaging the audience in live events are often embedded with LED strips to provide lighting effects. However, these devices are typically limited to a smaller set of LEDs, all facing in one or similar direction, which requires the audience to frequently check the wearable device, leading to poor engagement. Some existing wearable devices include haptic effects, which utilize tactile and force feedback technology to enhance the user's sense of touch by applying haptic feedback such as forces, vibrations, and motions. However, the vibrators in these devices are often not controlled for exciting patterns and creative experiences.

Additionally, conventional wearable devices used in the event industry are activated via a button on the product, limiting access to the user only. These devices are often designed for one-time use or require frequent battery replacements, making them expensive and limiting their long-term usability. Moreover, conventional wearable devices lack customizable macro functions that could integrate every end user into the event as part of the stage elements.

To fulfill this need in the market, one such invention is disclosed in the prior art as a wearable electronic accessory with LED, Bluetooth and RFID/NFC technology to receive information from connected devices, and for personal identification and data storage/exchange (U.S. Pub. No. US2017006414A1). This prior art discloses a wearable electronic accessory comprising a LED, Bluetooth, Vibracall and RFID/NFC technology which can be used in many applications such as identity accreditation for events or concerts, health care services for elderly people or people with disabilities, sport and physical activities etc. However, this prior art fails to disclose monetary transaction facility, data tracking and analytics capability. As such, this invention in the prior art is severely limited and unable to fulfill all the needs related to a wristband device for engaging the audience in a live event with a customized interactive lighting effect, existing vibration patterns, easy monetary transaction and data tracking and analytics capability.

There is another invention disclosed in the prior art as a substrate with lighting effect (U.S. Pat. No. 9,474,137B1). This prior art discloses a portable networked collaborative lighting effect system (substrate with a lighting effect). The system is configured to produce variable lighting effect in an event at a venue through various lighting devices. The system comprises an active or passive RFID chip for encoding the wearer financial information. In certain embodiments, the system can generate vibration sensations for the wearer. However, this prior art fails to disclose a means for controlling customizable lighting and vibrational patterns in the wristband unit. As such, this invention in the prior art is severely limited and unable to fulfill all the needs related to a wristband device for engaging the audience in a live event with a customized interactive lighting effect, existing vibration patterns, easy monetary transaction and data tracking and analytics capability.

There is yet another invention disclosed in the prior art as a method of configuring lighting effect patterns for interactive lighting effect devices (U.S. Pat. No. 9,913,344B2). This prior art discloses a process for configuring lighting effect patterns for interactive lighting effect devices located at the event venue. RF data bursts are captured to illuminate interactive lighting effect devices selectively in accordance with a matched data. However, this prior art fails to disclose alerting/signaling of the user with existing vibration sensation. As such, this invention in the prior art is severely limited and unable to fulfill all the needs related to a wristband device for engaging the audience in a live event with a customized interactive lighting effect, existing vibration patterns, easy monetary transaction and data tracking and analytics capability.

Accordingly, it is apparent that a need exists for a wristband device that can resolve many of the challenges of the existing wearable devices used in the live event industry.

BRIEF SUMMARY OF THE INVENTION

The present invention provides a wristband device for enhanced audience engagement at live events. The wristband comprises a band configured to be worn around the wrist of a user. The wristband device comprises a plurality of LEDs comprising up to thirty-six ultra-high brightness LEDs distributed around the band to provide 360-degree light emission for a dynamic and bright light experience. Each LED has a 120-degree emission angle.

The wristband device comprises a central dial unit incorporating a haptic motor with several levels of vibration intensity for providing synchronized vibrational feedback corresponding to an event's audio or visual elements. The haptic motor is integrated into the central dial unit of the wrist band device. The haptic motor is used to create an immersive experience with a vibration sensation feeling. The clients or the person conducting a live event can send vibrational signal to the wearer of the device to either signal an alert or highlight an aspect of a live event. The haptic motor is a variable-speed controller that brings a never-before-experienced physical feel element to events. Vibration intensity of the haptic motor can be altered and patterned by the production team/event team to give the perfect impact on a live show event. The wristband device can implement signature haptic patterns, which are unique vibration sequences associated with a brand or other brands. These patterns can be programmed into the wristbands to provide a distinctive tactile experience, enhancing brand recognition and user engagement. Each haptic pattern can be customized to create a specific feel that users can identify with a particular brand, adding an extra layer of personalization and interactivity to the wristband device.

The central dial unit of the wristband device incorporates a control unit for managing lighting patterns and colors of the plurality of LEDs and the several levels of the vibrational intensity of the haptic motor. The control unit employs Digital Multiplex signals to control the plurality of LEDs and the haptic motor via radio frequency through one or more transmitters. The control unit operates on multiple frequencies, specifically 2.4 GHz and 5 GHz to create a captivating and memorable immersive lighting experience for the user.

The control unit is configured as an eight-channel fixture comprising eight channels. The first channel controls the red LED pixels. The second channel controls the green LED pixels. The third channel controls the blue LED pixels. The fourth channel controls the strobe function allowing any color to strobe at various frequencies. The fifth channel controls the vibration function allowing speed adjustment and intensity of vibrations. The sixth channel comprises pre-built lighting sequences for lighting chases, flashes, and alternating patterns with the capability to accommodate custom lighting sequences. The seventh channel controls white LED values, allowing for adjustment of white light intensity and temperature. The eighth channel enables new macro effects, allowing for the creation and control of complex lighting patterns and synchronized effects. The control unit allows RGB control of each LED separately as well as all at once to create various interactive light spectra in the wristband device. The control unit facilitates the division of the wristband devices into multiple groups or zones for synchronized control. Each group or zone of the wristband device is controlled individually within a single Digital Multiplex environment.

The central dial unit of the wristband device incorporates an RFID-based chip for data collection and communication with event management systems. The RFID-based chip is integrated into the wristband device. The RFID-based chip brings endless possibilities in cashless payment and data analytics. The RFID-based chip enables the user to pair with numerous event management software to let the wristband as a scannable/tappable ticket. This allows the end user to have access to all available offerings such as food, and beverages, gain access to the VIP area, purchase merchandise at the event without having to manage cash/credit cards and also allows the client to track data to see trends in purchases and the flow of attendee in a live event. Overall, the RFID compatibility in the wristband device allows control of all the associated capabilities and transfer all the required information to Event Management Tools/services/providers to track the data of the attendees associated with the live event. The RFID-based chip (RFID) may be an ultra-high frequency (UHF) chip, or Near Field Communication (NFC) chip that allows connecting to an event management software and also to other services that utilize similar readable chips. This will be helpful for data tracking, access control, interactive activations, etc., A rechargeable battery via USB-C quick charging is integrated in the wristband device which avoids the frequent replacement of the product and provides long-term usage. The rechargeable battery allows for a full charge in under an hour and the USB-C charging port ensures the fastest and most up-to-date offering which enables quick charging of the wristband device. This rechargeable battery (via USB-C) allows the wristband device to be reused after the event or used multiple times within the same event.

The wristband device comprises a flexible strap unit comprising a first strap and a second strap, respectively connected to opposite end portions of the central dial unit. The first strap is equipped with multiple evenly spaced holes for adjustable fitting, and the second strap comprises a clasp that engages with the holes of the first strap for securing the device on the wrist of the user.

Two activation modes are used to control the functions of the wristband device. The two activation modes are preferably, remote and push-button modes. The remote activation mode is controlled by Radiofrequency Digital multiplex (RF DMX) and the push button is activated manually. The activation mode is RFID/NFC/UHF Compatible. The push button enables the user to control functions of the wristband device directly. The DMX controls the red-green-blue (RGB) light of the plurality of LEDs present in the wristband device. Furthermore, the wristband also possesses the capability to customize some of the "macro" functions as per the client's need. Specific lighting patterns and vibration pattern is programmed down to the chip level to provide a 100% unique lighting experience in the wristband device. The wristband device can be fully customized to meet the client's specifications, featuring a variety of pre-programmed lighting effects within a single unit. This allows each wristband device to bring dynamic life and visual impact to every wearer's wrist. The wristband device is provided with an adjustable strap and is made of various materials.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the invention and the claims. A wristband device for enhanced audience engagement at live events is discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below. The present invention will now be described by referencing the appended figures representing preferred embodiments.

Figure 1:
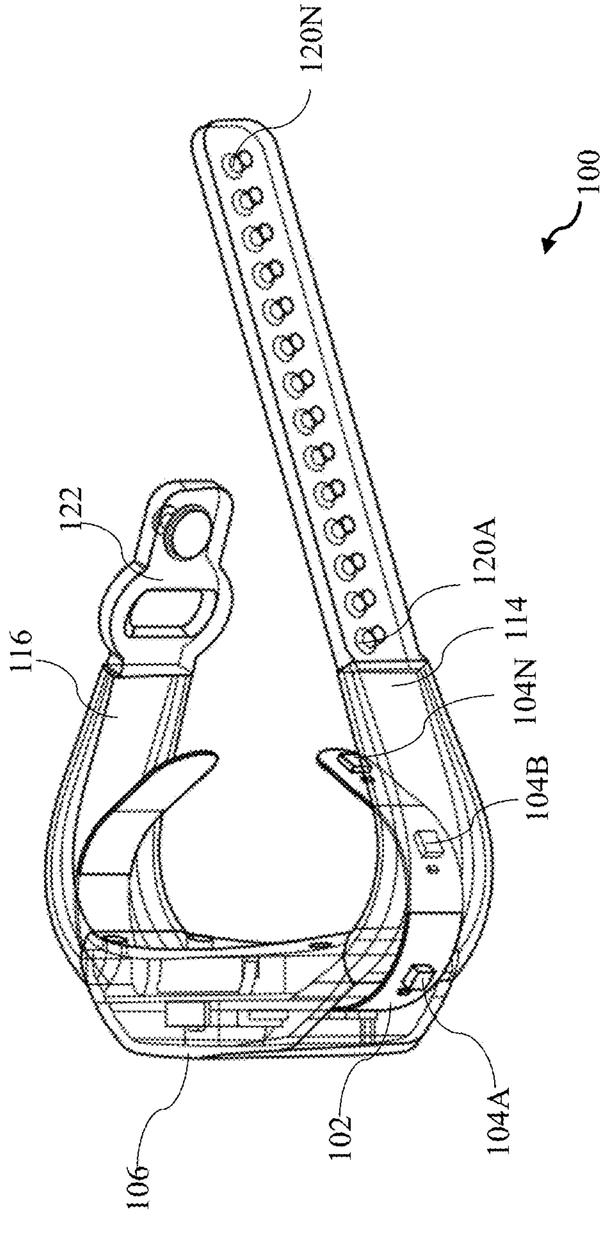
FIG. 1 illustrates a wristband device to engage an audience in a live event according to various embodiments of the present invention.

FIG. 1 illustrates a wristband device to engage an audience in a live event according to various embodiments of the present invention. The wristband device 100 comprises a band 102, a plurality of LEDs 104A-N, a central dial unit 106, a haptic motor 108 (Not shown in FIG. 1), a control unit 110 (Not shown in FIG. 1), an RFID-based chip 112 (Not shown in FIG. 1), a flexible strap unit comprising a first strap 114 and a second strap 116 and a charging port 118 (Not shown in FIG. 1).

FIG. 1 further illustrates the plurality of LEDs 104A-N comprising up to thirty-six ultra-high brightness LEDs distributed around the band 102 to provide 360-degree light emission. Each LED affixed around the band 102 has a 120-degree emission angle which produces the brightest and virtuous lively effect in the live event. The plurality of LEDs 104A-N are controlled by the control unit 110 employing Radio frequency Digital Multiplex (RF DMX) which operates on two available frequencies such as 2.4 GHz and 5 GHz to create a memorable immersive lighting experience for a user of the wristband device. Further, the plurality of LEDs 104A-N can be independently controlled to create various or customized lighting spectrums in the wristband device 100.

FIG. 1 further illustrates the central dial unit 106 that houses the haptic motor 108, the control unit 110, and the RFID-based chip 112. The central dial unit 106 is a touchscreen dial integrated with a microcircuit. The central dial unit 106 includes a transparent cover to allow visibility of internal lighting effects, enhancing visual engagement during the event.

The haptic motor 108 is integrated into the central dial unit 106 of the wristband device 100. The haptic motor 108 is configured to generate a vibration signal to the wearer of the wristband device 100 to signal an alert or highlight an aspect of the live event. Further, the haptic motor 108 provides variable speed control which produces several different types of motor speeds to create exciting patterns and creative vision for the wearer of the wristband device 100. The control unit 110 controls the vibrational intensity levels of the haptic motor 108 via radio frequency using one or more transmitters.

The RFID-based chip 112 is integrated into the central dial unit 106 of the wristband device 100. The RFID-based chip 112 facilitates data collection and communication with event management systems. The RFID-based chip 112 enables the user to pair with numerous event management software to let the wristband device as a scannable/tappable ticket. The wearer or user can have the access to all available offerings such as food and beverages, access to the VIP area, purchase of merchandise at the event without having to manage cash/credit cards by the usage of the RFID-based chip 112. Further, the RFID-based chip 112 allows the client to track data to see inclinations in purchases and the flow of attendees in the live event. Further, the RFID-based chip 112 compatibility in the wristband device 100 allows control of all the associated capabilities and transfers all the required information to Event Management Tools/services/providers to track the data of the attendees associated with the live event. The RFID-based chip 112 may be an ultra-high frequency (UHF) or Near Field Communication (NFC) chip that allows the wristband device 100 to link with various event management software and other services that utilize similar readable chips which makes easier data tracking, access control and interactive activation function.

The customization of light and the vibration feature is provided in a single wristband 100. The customization functions of the wristband device 100 are controlled by a Digital multiplex (DMX) via radio frequency. A combination of specific lighting and vibration patterns is programmed down to the chip level to offer a unique lighting and vibration experience in the wristband device 100. There are eight channel fixtures in a DMX control point. The first channel controls the red LED pixels. The second channel controls the green LED pixels. The third channel controls the blue LED pixels. The fourth channel controls the strobe function, allowing any color to strobe at various frequencies. The fifth channel controls the vibration function allowing adjustment of speed and intensity of vibrations. The sixth channel comprises pre-built lighting sequences for lighting chases, flashes, and alternating patterns with the capability to accommodate custom lighting sequences. The seventh channel controls the white LED values. The seventh channel allows users to adjust the intensity and temperature of white light, providing a full spectrum of white tones from warm to cool. This enhances the ability of the wristband 100 to create more natural lighting conditions and improve visibility and aesthetic appeal. The eighth channel enables new macro effects. The eighth channel allows for creation and the control of complex lighting patterns and synchronized effects. Macro effects enable the integration of multiple lighting sequences and patterns, allowing for a more immersive and coordinated visual experience. The eighth channel expands the creative possibilities, making the wristband 100 suitable for more advanced and intricate lighting applications. By incorporating the seventh and eighth channels, the wristband device 100 offers enhanced functionality, allowing users to achieve a broader range of lighting effects and improve the overall user experience. The ability to control white values and add new macro effects ensures that the device can meet diverse requirements, from simple color adjustments to complex lighting displays. The control unit 110 allows for RGB control of each LED separately as well as all at once, providing granular control over the color output. This flexibility ensures that users can create precise color combinations and transitions, tailored to their specific needs and preferences.

The charging port 118 offers the power source to the batteries integrated into the central dial unit 106. A rechargeable battery is integrated into the central dial unit 106 of the wristband device 100. The batteries are recharged using an external power source such as USB-C. The batteries are completely charged within an hour.

FIG. 1 further illustrates the flexible strap unit comprising a first strap 114 and the second strap 116, respectively connected to opposite end portions of the central dial unit 106. The first strap 114 is equipped with multiple evenly spaced holes 120A-N for adjustable fitting, and the second strap 116 comprises a clasp 122 that engages with the holes of the first strap 114 for securing the device 100 on the wrist of the user.

The wristband device 100 is designed to deliver a haptic response upon interaction with an RFID reader. The RFID-based chip 112 comprises an RFID antenna that captures signals from the RFID reader. The signals are processed by the RFID-based chip 112 equipped with a GPIO (General Purpose Input/Output) output pin, which then sends a notification to the control unit 110 which is an MCU (Microcontroller Unit). The Power for the wristband device 100 is provided by either two CR20xx coin cell batteries or a 3.7V LiPo battery, ensuring the wristband device 100 remains functional. Upon receiving the signal from the RFID-based chip 112, the control unit 110 which includes a PWM (Pulse Width Modulation) controller, manages the vibrational intensity of the haptic feedback. The control unit 110 sends commands to a motor driver equipped with a MOSFET, diode, and large capacitor, to regulate power and control the haptic motor 108. This haptic motor 108 then delivers the haptic response, providing tactile feedback to the user. The RFID-based chip 112 may be a ST25DV04KC-IE8S3 NFC chip, the control unit 110 may be a CH32V003F4U6 microcontroller, and the haptic motor 108 may include a LCM1027A2445F haptic actuator to enable seamless interaction and feedback mechanism.

Figure 2:
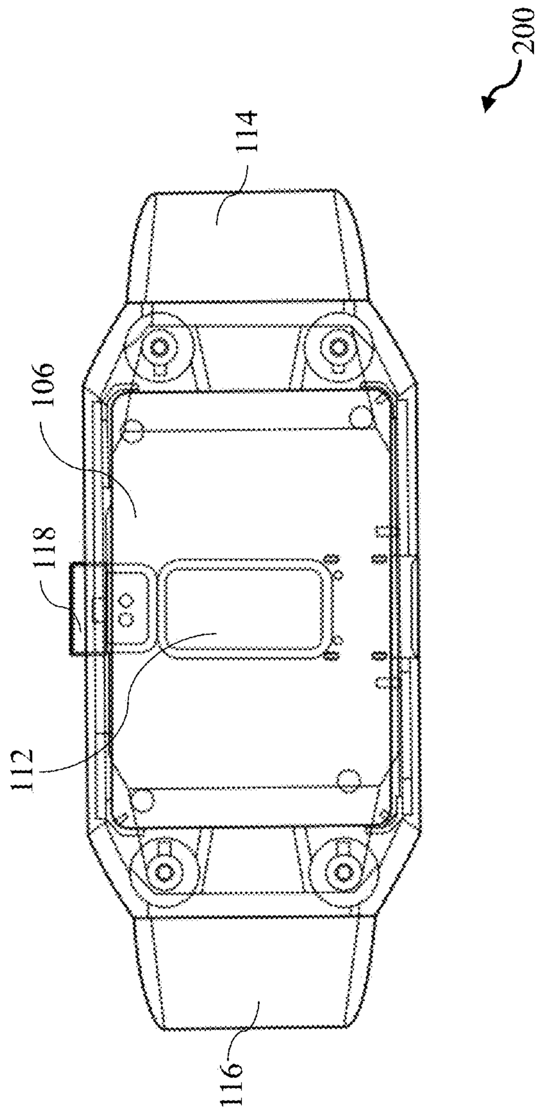
FIG. 2 illustrates the front view of the wristband device of FIG. 1 according to various embodiments of the present invention.

FIG. 2 illustrates the front view of the wristband device of FIG. 1 according to various embodiments of the present invention. The front view 200 of the wristband device 100 shows the central dial unit 106 comprising the RFID-based chip 112, the charging port 118, the first strap 1114 and the second strap 116. The functioning of the components has been described in FIG. 1.

Figure 3:
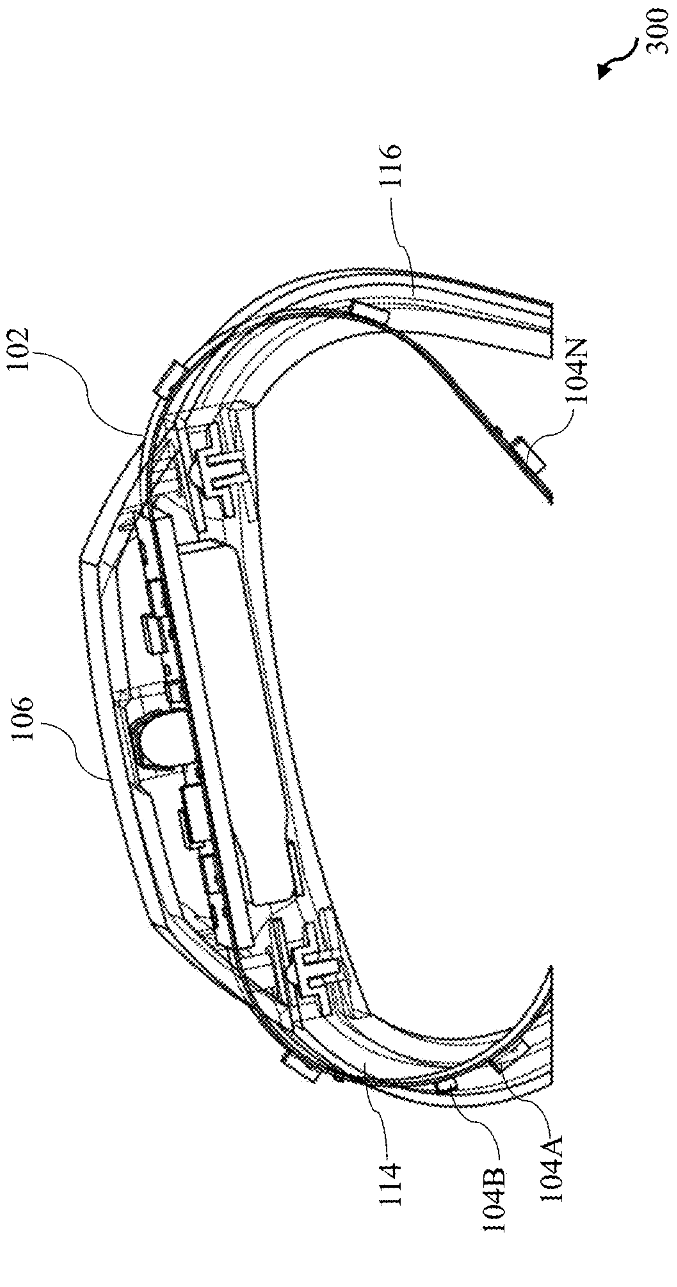
FIG. 3 illustrates the side view of the wristband device of FIG. 1 according to various embodiments of the present invention.

FIG. 3 illustrates the side view of the wristband device of FIG. 1 according to various embodiments of the present invention. The side view 300 of the wristband device 100 shows the band 102, the plurality of LEDs 104A-N, the central dial unit 106, the first strap 114 and the second strap 116. The functioning of the components has been described in FIG. 1.

Figure 4:
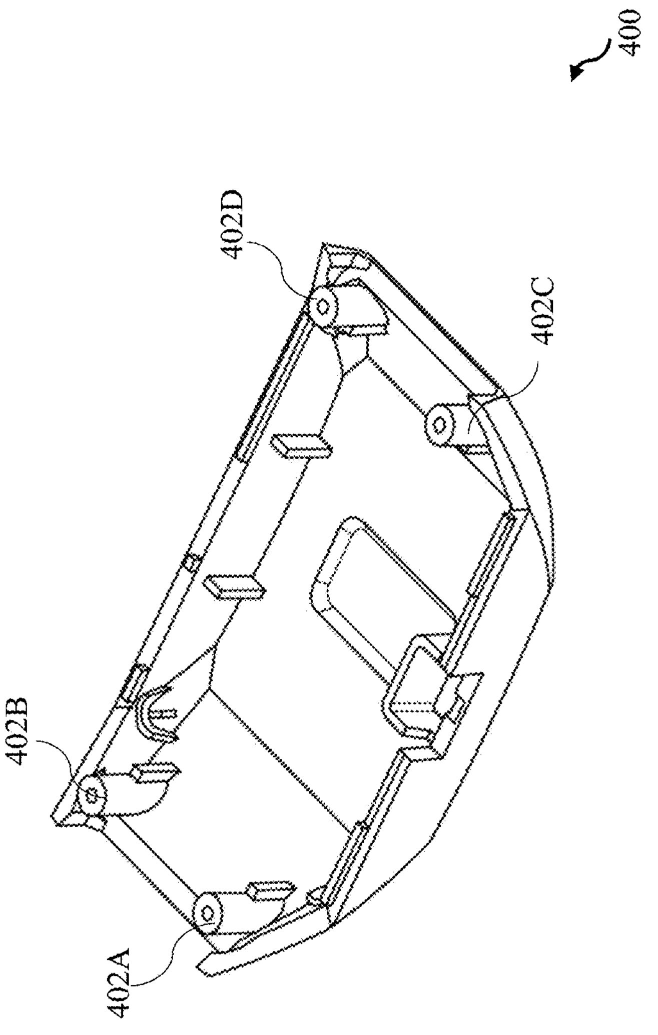
FIG. 4 illustrates the bottom view of the top portion of the central dial unit of the wristband device of FIG. 1 according to various embodiments of the present invention.

FIG. 4 illustrates the bottom view of the top portion of the central dial unit of the wristband device of FIG. 1 according to various embodiments of the present invention. The bottom view 400 of the central dial unit 106 includes holes 402A, 402B, 402C and 402D configured to fix the protrusion in the bottom portion of the central dial unit 106.

Figure 5:
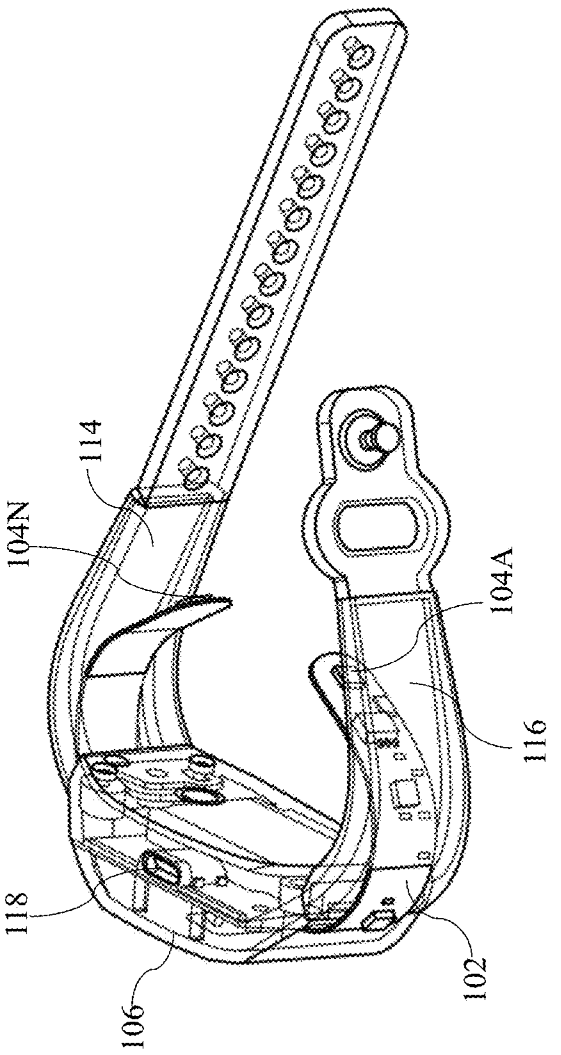
FIG. 5 illustrates the wristband device of FIG. 1 with the charging port according to various embodiments of the present invention.

FIG. 5 illustrates the wristband device of FIG. 1 with the charging port according to various embodiments of the present invention. FIG. 5 shows the band 102, the plurality of LEDs 104A-N, the central dial unit 106, the first strap 114, the second strap 116 and the charging port 118. The wristband device 100 is recharged using a USB-C charger fixed to the charging port 118. The functioning of the components has been described in FIG. 1.

Figure 6:
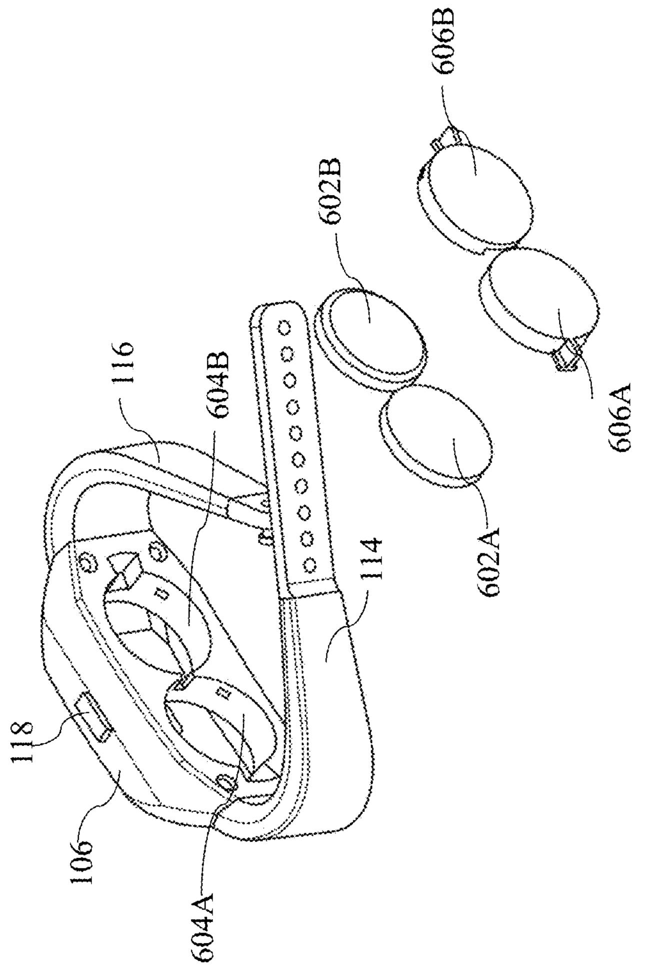
FIG. 6 illustrates the wristband device of FIG. 1 with a battery port, rechargeable batteries and a closing element of the batteries according to various embodiments of the present invention.

FIG. 6 illustrates the wristband device of FIG. 1 with a battery port, rechargeable batteries and a closing element of the batteries according to various embodiments of the present invention. The rechargeable batteries 602A-B are affixed into the battery port 604A-B and the battery port 604A-B is closed using the closing element 606A-B. FIG. 6 shows the central dial unit 106, the first strap 114, the second strap 116 and the charging port 118. The functioning of the components has been described in FIG. 1.

Figure 7:
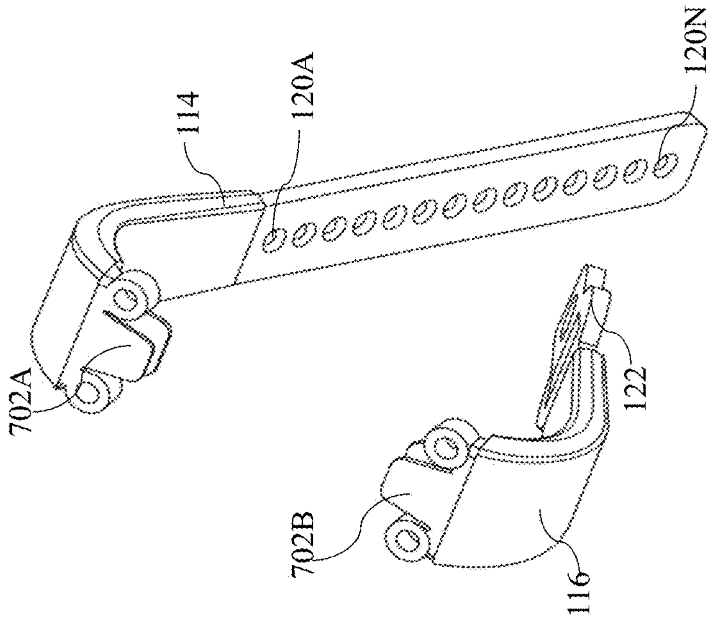
FIG. 7 illustrates the flexible strap unit of the wristband device of FIG. 1 according to various embodiments of the present invention.

FIG. 7 illustrates the flexible strap unit of the wristband device of FIG. 1 according to various embodiments of the present invention. The flexible strap unit includes the first strap 114 and the second strap 116 respectively connected to opposite end portions of the central dial unit 106 through a connecting member 702A-B. The first strap 114 is equipped with multiple evenly spaced holes 120A-N for adjustable fitting, and the second strap 116 comprises a clasp 122 that engages with the holes 120A-N of the first strap 114 for securing the device 100 on the wrist of the user.

Figure 8:
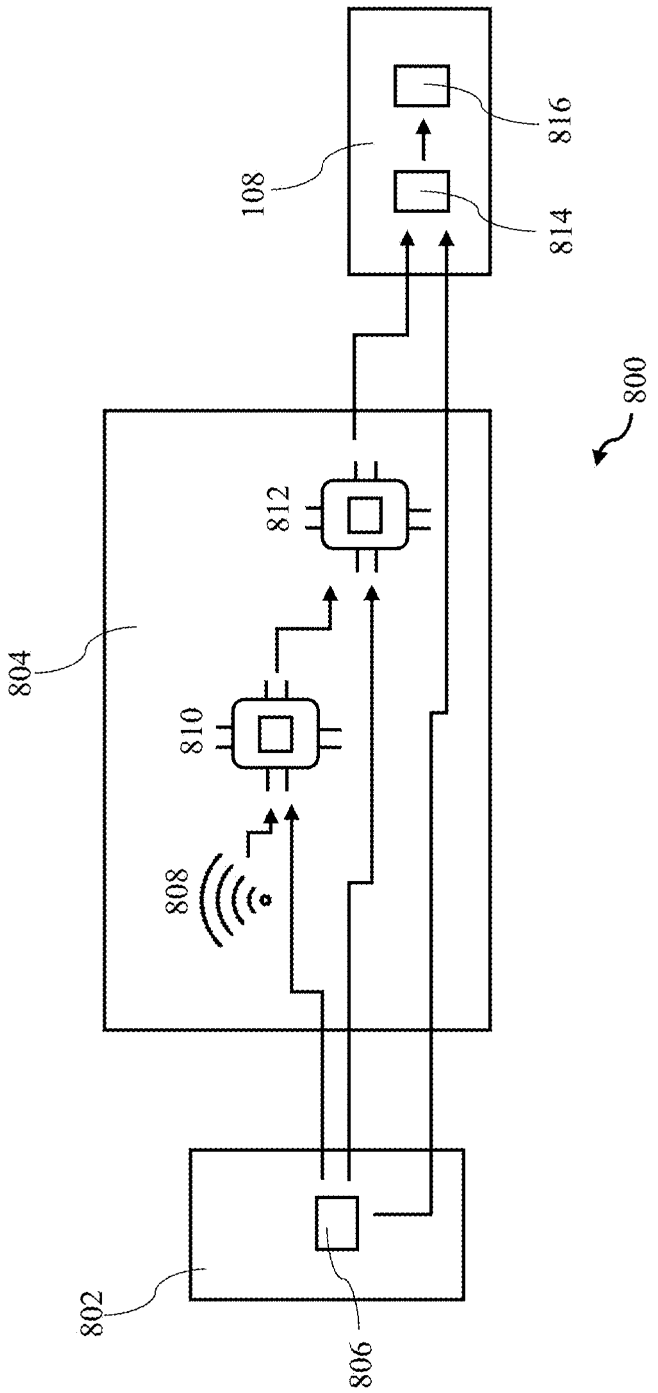
FIG. 8 illustrates a system designed to trigger a haptic response in the wristband device of FIG. 1 when scanned by an NFC or RFID Reader according to various embodiments of the present invention.

FIG. 8 illustrates a system designed to trigger a haptic response in the wristband device of FIG. 1 when scanned by an NFC or RFID Reader according to various embodiments of the present invention. The system 800 includes power management 802, NFC or RFID and control 804, and the haptic motor 108. The power management 802 includes a 100 mAh battery 806 that provides power ensuring continuous operation of the wristband device 100. The NFC or RFID and control 804 includes the NFC or RFID Reader 808 that detects the presence of an NFC chip 810 (specifically the ST25DV04KC) embedded in the wristband device 100.

When the NFC Reader 808 reads the NFC chip 810, the NFC chip 810 acknowledges the read event and sends a signal to the microcontroller 812. The microcontroller (MCU) 812 coordinates the response based on the input from the NFC chip 810. Upon receiving the notification from the Microcontroller 812, the haptic driver 814 is activated. The haptic driver 814 controls the haptic actuator 816, which produces the physical vibrations. This haptic feedback is delivered to the wearer, providing a tactile response to the NFC scanning event. The haptic driver 814 generates the control signals for the haptic motor 108. The haptic driver 814 interprets input from the microcontroller 812 and translates it into specific commands that determine the intensity, frequency, and pattern of the vibrations. The haptic actuator 816 produces the actual vibrations or haptic feedback. The haptic actuator 816 converts the electrical signals from the haptic driver 814 into physical motion, providing the tactile sensations that users feel. When the wristband device 100 is scanned by an NFC or RFID Reader 808, a sequence of events is initiated, resulting in the activation of the haptic motor 108 and the delivery of a haptic response, enhancing user interaction and engagement.

While the present invention has been described in terms of particular embodiments and applications, in both summarized and detailed forms, it is not intended that these descriptions in any way limit its scope to any such embodiments and applications. It will be understood that many substitutions, changes and variations in the described embodiments, applications and details of the method and system illustrated herein and of their operation can be made by those skilled in the art without departing from the spirit of this invention.

What is claimed is:

1. A wristband device for enhanced audience engagement at live events, wherein the wristband device comprises:

a plurality of LEDs distributed around a band for providing light emission;

a central dial unit incorporating a haptic motor with variable speed control for providing vibrational feedback, a control unit for managing lighting patterns and colors of the plurality of LEDs and a level of intensity of the vibration of the haptic motor, wherein the control unit employs Digital Multiplex control signals to control the plurality of LEDs, the haptic motor is controlled via radio frequency through one or more transmitters, wherein the control unit operates on multiple frequencies, specifically 2.4 GHz and 5 GHz, wherein the band comprising the plurality of LEDs passes through the central dial unit, and an RFID-based chip for data collection and communication with event management systems; and a flexible strap unit comprising a first strap and a second strap, respectively connected to opposite end portions of the central dial unit, wherein the first strap is equipped with multiple evenly spaced holes for adjustable fitting, and the second strap comprises a clasp that engages with the holes of the first strap for securing the device on the wrist.

2. The wristband device of claim 1, wherein the control unit is configured to control RGB color of the plurality of LEDs via radio frequency, enabling display of 16.7 million colors through the RGB spectrum.

3. The wristband device of claim 1, wherein the haptic motor is configured to provide several levels of vibration intensity, wherein the haptic motor provides synchronized vibrational feedback corresponding to an event's audio or visual elements.

4. The wristband device of claim 1, wherein the control unit is configured as an eight-channel fixture comprising, (i) a first channel controlling the red LED pixels, (ii) a second channel controlling the green LED pixels, (iii) a third channel controlling the blue LED pixels, (iv) a fourth channel controlling strobe function, allowing any color to strobe at various frequencies, (v) a fifth channel controlling the vibration function allowing adjustment of speed and intensity of vibrations, (vi) a sixth channel comprising pre-built lighting sequences for lighting chases, flashes, and alternating patterns with the capability to accommodate custom lighting sequences, (vii) a seventh channel controlling white LED values, allowing for adjustment of white light intensity and temperature, and (viii) an eighth channel enabling new macro effects, allowing for the creation and control of complex lighting patterns and synchronized effects, wherein the control unit allows for RGB control of each LED separately as well as all at once.

5. The wristband device of claim 1, wherein the control unit facilitates division of the wristband devices into multiple groups or zones for synchronized control, wherein each group or zone of the wristband device is controlled individually within a single Digital Multiplex environment.

6. The wristband device of claim 1, wherein each LED of the plurality of LEDs distributed around the band provides a 120-degree emission angle to achieve 360-degree light emission.

7. The wristband device of claim 1, wherein the wristband comprises a push-button for manual activation, wherein the push button enables the user to control functions of the wristband device directly.

8. The wristband device of claim 1, wherein the wristband device comprises an integrated rechargeable battery chargeable via a USB port.

9. A wristband device for enhanced audience engagement at live events, wherein the wristband device comprises:

a plurality of LEDs distributed around a band for providing light emission;

a central dial unit incorporating a haptic motor with variable speed control for providing vibrational feedback, a control unit for managing lighting patterns and colors of the plurality of LEDs and a level of intensity of the vibration of the haptic motor, wherein the band comprising the plurality of LEDs passes through the central dial unit, wherein the control unit employs Digital Multiplex signals to control the plurality of LEDs and the haptic motor via radio frequency through one or more transmitters, wherein the control unit operates on multiple frequencies, specifically 2.4 GHz and 5 GHz, and an RFID-based chip for data collection and communication with event management systems; and a flexible strap unit comprising a first strap and a second strap, respectively connected to opposite end portions of the central dial unit, wherein the first strap is equipped with multiple evenly spaced holes for adjustable fitting, and the second strap comprises a clasp that engages with the holes of the first strap for securing the device on the wrist.

10. The wristband device of claim 9, wherein the wristband device comprises an integrated rechargeable battery chargeable via a USB port.

11. The wristband device of claim 9, wherein the control unit is configured to control RGB colors of the plurality of LEDs via radio frequency, enabling display of 16.7 million colors through the RGB spectrum.

12. The wristband device of claim 9, wherein each LED of the plurality of LEDs distributed around the band provides a 120-degree emission angle to achieve 360-degree light emission.

13. The wristband device of claim 9, wherein the haptic motor is configured to provide several levels of vibration intensity, wherein the haptic motor provides synchronized vibrational feedback corresponding to an event's audio or visual elements.

14. The wristband device of claim 9, wherein the control unit is configured as an eight-channel fixture comprising: (i) a first channel controlling the red LED pixels, (ii) a second channel controlling the green LED pixels, (iii) a third channel controlling the blue LED pixels, (iv) a fourth channel controlling strobe function, allowing any color to strobe at various frequencies, (v) a fifth channel controlling the vibration function allowing adjustment of speed and intensity of vibrations, (vi) a sixth channel comprising pre-built lighting sequences for lighting chases, flashes, and alternating patterns with the capability to accommodate custom lighting sequences, (vii) a seventh channel controlling white LED values, allowing for adjustment of white light intensity and temperature, and (viii) an eighth channel enabling new macro effects, allowing for the creation and control of complex lighting patterns and synchronized effects, wherein the control unit allows for RGB control of each LED separately as well as all at once.

15. The wristband device of claim 9, wherein the wristband comprises a push-button for manual activation, wherein the push button enables the user to control functions of the wristband device directly.

16. The wristband device of claim 9, wherein the control unit facilitates division of the wristband devices into multiple groups or zones for synchronized control, wherein each group or zone of the wristband device is controlled individually within a single Digital Multiplex environment.

17. A wristband device for enhanced audience engagement at live events, wherein the wristband device comprises:

a plurality of LEDs comprising up to thirty-six ultra-high brightness LEDs distributed around a band to provide 360-degree light emission, wherein each LED has a 120-degree emission angle;

a central dial unit incorporating a haptic motor with several levels of vibration intensity for providing synchronized vibrational feedback corresponding to an event's audio or visual elements, a control unit for managing lighting patterns and colors of the plurality of LEDs and the several levels of the vibrational intensity of the haptic motor, wherein the band comprising the plurality of LEDs passes through the central dial unit, wherein the control unit employs Digital Multiplex signals to control the plurality of LEDs and the haptic motor via radio frequency through one or more transmitters, wherein the control unit operates on multiple frequencies, specifically 2.4 GHz and 5 GHz, and an RFID-based chip for data collection and communication with event management systems; and an integrated rechargeable battery chargeable via a USB port; and a flexible strap unit comprising a first strap and a second strap, respectively connected to opposite end portions of the central dial unit, wherein the first strap is equipped with multiple evenly spaced holes for adjustable fitting, and the second strap comprises a clasp that engages with the holes of the first strap for securing the device on the wrist.

18. The wristband device of claim 17, wherein the wristband comprises a push-button for manual activation, wherein the push button enables the user to control functions of the wristband device directly.

19. The wristband device of claim 17, wherein the control unit is configured as an eight-channel fixture comprising: (i) a first channel controlling the red LED pixels, (ii) a second channel controlling the green LED pixels, (iii) a third channel controlling the blue LED pixels, (iv) a fourth channel controlling strobe function, allowing any color to strobe at various frequencies, (v) a fifth channel controlling the vibration function allowing adjustment of speed and intensity of vibrations, (vi) a sixth channel comprising pre-built lighting sequences for lighting chases, flashes, and alternating patterns with the capability to accommodate custom lighting sequences, (vii) a seventh channel controlling white LED values, allowing for adjustment of white light intensity and temperature, and (viii) an eighth channel enabling new macro effects, allowing for the creation and control of complex lighting patterns and synchronized effects, wherein the control unit allows for RGB control of each LED separately as well as all at once, wherein the control unit facilitates division of the wristband devices into multiple groups or zones for synchronized control, wherein each group or zone of the wristband device is controlled individually within a single Digital Multiplex environment.

* * * * *